2,993,896

N-[(2,4-DIAMINOTRIAZIN-6-YL)METHYL]-3-OXYPYRIDYL BETAINES

Seymour L. Shapiro, Hastings on Hudson, and Louis Freedman, Bronxville, N.Y., assignors to U.S. Vitamin & Pharmaceutical Corporation, a corporation of Delaware
No Drawing. Filed Apr. 13, 1960, Ser. No. 21,893
6 Claims. (Cl. 260—249.9)

This invention is concerned with N-[(2,4-aminotriazin-6-yl)-methyl]-3-oxypyridyl betaines of the following formula:

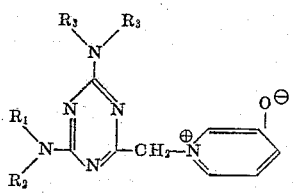

wherein $R_1$ is selected from the group consisting of lower alkyl, aralkyl, and aryl, $R_2$ is selected from the group consisting of hydrogen and methyl and those compounds wherein $R_1R_2N-$ is a heterocyclic group such as indolino, and $R_3$ is selected from the group consisting of hydrogen and methyl.

The compounds of this invention are prepared by the reaction of the chloromethyltriazine with 3-hydroxypyridine in a suitable solvent such as isopropyl alcohol or acetonitrile and the like, according to the following equation:

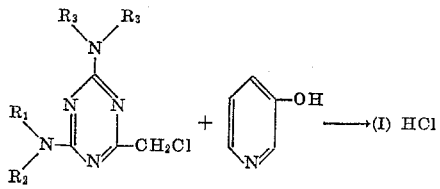

After a suitable reflux period the hydrochloride salt of the betaine precipitates or forms on cooling and is separated. The structural assignment has been made on the basis of noted effervescence upon addition of saturated sodium bicarbonate solution to (I) HCl in water indicating that a hydrochloride salt has been formed rather than the anticipated quaternary salt. The presence of the free oxygen group in (I) in the 3-position of the pyridine ring has been indicated by strong ferric chloride reaction (orange color). The required chloromethyltriazine is prepared from the appropriate biguanide following established procedures in the literature [Shapiro et al., J. Am. Chem. Soc., 76, 97 (1954)], and the 3-hydroxypyridine is commercially accessible.

The compounds of this invention have pharmacological action, particularly as central nervous system depressants.

The process and compounds of this invention will be more clearly understood from the consideration of the following examples which are given for the purpose of illustration only and are not to be construed as limiting the scope of the invention in any way.

Example 1

A mixture of 2.6 g. (0.01 mole) of 2-anilino-4-dimethylamino-6-chloromethyl-s-triazine and 1.0 g. (0.01 mole) of 3-hydroxypyridine in 15 ml. of isopropyl alcohol was heated under reflux with stirring for 6 hours. When cooled, the formed precipitate of product was separated and recrystallized (ethanol), M.P. over 250°.
*Analysis.*—Calcd. $C_{17}H_{19}ClN_6O$: C, 56.9; H, 5.3; N, 23.4. Found: C, 56.5; H, 5.3; N, 23.8.

Example 2

Following the procedure of Example 1 and using 2-amino - 4 - (N-methylbenzylamino) - 6 - chloromethyl-s-triazine, the corresponding betaine hydrochloride was obtained and recrystallized (acetonitrile), M.P. 206–208°.
*Analysis.*—Calcd. $C_{17}H_{19}ClN_6O$: C, 56.9; H, 5.3; N, 23.4. Found: C, 56.9; H, 5.6; N, 23.5.

Example 3

Following the procedure of Example 1 and using 2-amino-4-n-butylamino-6-chloromethyl-s-triazine, the corresponding betaine hydrochloride was obtained and recrystallized (isopropyl alcohol), M.P. 244–245°.
*Analysis.*—Calcd. for $C_{13}H_{19}ClN_6O$: C, 50.2; H, 6.2; N, 27.1. Found: C, 50.2; H, 6.4; N, 27.4.

Example 4

Following the procedure of Example 1 and using 2-dimethylamino - 4 - indolino-6-chloromethyl-s-triazine, the corresponding betaine hydrochloride was obtained and recrystallized (isopropyl alcohol), M.P. 220–230°.
*Analysis.*—Calcd. $C_{19}H_{21}ClN_6O$: C, 59.3; H, 5.5. Found: C, 58.9; H, 6.0.

Example 5

Following the procedure of Example 1 and using 2-amino-4-indolino - 6 - chloromethyl-s-triazine, the corresponding betaine hydrochloride was obtained and recrystallized (water), M.P. over 234–240°.
*Analysis.*—Calcd. $C_{17}H_{17}ClN_6O$: C, 57.2; H, 4.8. Found: C, 56.6; H, 5.4.

Example 6

In a similar manner to Example 1 and using 2-amino-4-dimethylamino - 6 - chloromethyl-s-triazine, the corresponding betaine hydrochloride was obtained, melting over 250°. The analysis indicated that the compound was a hydrate.
*Analysis.*—Calcd. $C_{11}H_{17}ClN_6O_2$: C, 43.9; H, 5.7. Found: C, 44.5; H, 5.7.

The hydrochloride so obtained may be converted to the free betaine by treatment with an equivalent quantity of base such as sodium hydrochloride or sodium bicarbonate.

For therapeutic purposes the compounds of this invention are formulated to contain 50–150 mg. of active ingredient in a pharmaceutical extender which does not co-act with the active principles described herein.

It is to be understood that it is intended to cover all changes and modifications of the examples of the invention herein chosen for the purposes of illustration which do not constitute departures from the spirit and scope of the invention.

We claim:
1. The compound of the following formula:

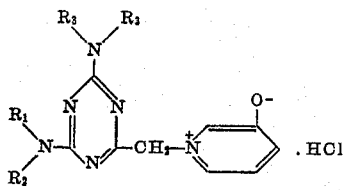

wherein $R_1$ is selected from the group consisting of lower alkyl, benzyl and phenyl, $R_2$ is selected from the group consisting of hydrogen and methyl and the compound wherein $R_1R_2N-$ is indolino, and $R_3$ is selected from a group consisting of hydrogen and methyl.

2. The compound
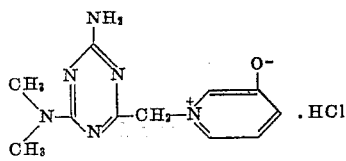 .HCl
3. The compound
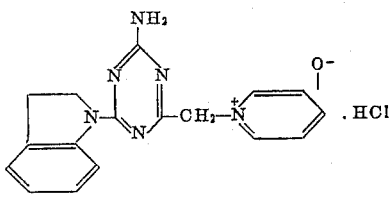 .HCl
4. The compound
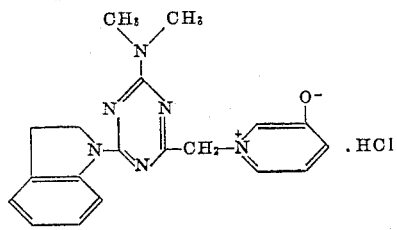 .HCl
5. The compound
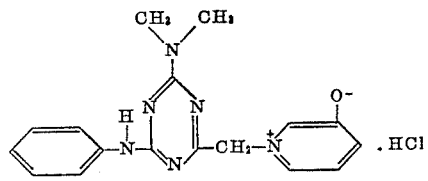 .HCl
6. The compound
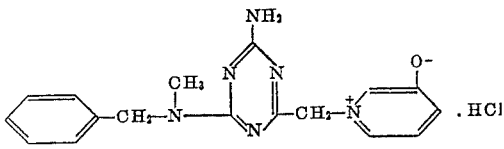 .HCl
References Cited in the file of this patent
UNITED STATES PATENTS
| | | |
|---|---|---|
| 2,719,156 | De Benneville | Sept. 27, 1955 |
| 2,937,173 | Shapiro et al. | May 17, 1960 |
OTHER REFERENCES
Detweiler et al.: Journal American Chemical Society, vol. 74, pages 1483–85 (1952).
Overberger et al.: Journal American Chemical Society, vol. 76, pages 1855–56 (1954).